United States Patent [19]
Lim

[11] Patent Number: 6,120,296
[45] Date of Patent: Sep. 19, 2000

[54] EDUCATIONAL BOARD GAME

[76] Inventor: Sutinah Lim, 274 County Rd., Apt. 3B, Tenafly, N.J. 07670

[21] Appl. No.: 09/368,654

[22] Filed: Aug. 5, 1999

[51] Int. Cl.[7] .............................. G09B 19/22; A63F 1/00; A63F 9/20
[52] U.S. Cl. .......................... 434/128; 273/292; 273/293; 273/302
[58] Field of Search ..................................... 273/243, 249, 273/250, 251, 252, 253, 254, 429, 430, 431, 432, 256, 302; 434/128

[56] References Cited

U.S. PATENT DOCUMENTS

| | | | |
|---|---|---|---|
| 4,109,918 | 8/1978 | Mele et al. .............................. | 273/256 |
| 4,907,808 | 3/1990 | Turner et al. ............................ | 273/240 |

FOREIGN PATENT DOCUMENTS

| | | | |
|---|---|---|---|
| 2250207 | 3/1992 | United Kingdom ................... | 273/243 |

*Primary Examiner*—Sam Rimell
*Assistant Examiner*—Bena B. Miller

*Attorney, Agent, or Firm*—McHale & Slavin

[57] ABSTRACT

An educational board game includes a game board divided into a plurality of play locations sized to accept player position markers. The play locations are divided into five categories of spaces. Landing of each type of location produces distinct results. Motion of the position markers along the play path is governed by a random number generator, such as a pair of dice. Some of the play locations have associated decks of cards, with each of the cards testing a player's knowledge of behavior appropriate for dangerous situations or safety rules. Players are given reward tokens for providing correct responses to the questions posed by the cards. Other play locations require players to recite an accepted rule for safe street crossing; players receive tokens for correctly reciting one of the rules. Players also receive tokens for landing upon "safe haven" locations. The tokens are traded for six types of collectible items, with possession of each type of item being required to win the game. A player may win the game by returning to a corresponding "home spot" play location after gathering all six types of collectable items.

5 Claims, 6 Drawing Sheets

Street Smart Game Board
(Direction of Play)

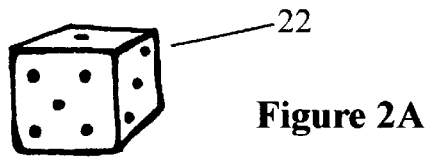
Figure 2A
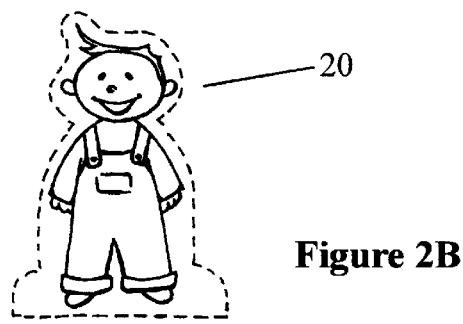
Figure 2B
Figure 2C
Figure 2D
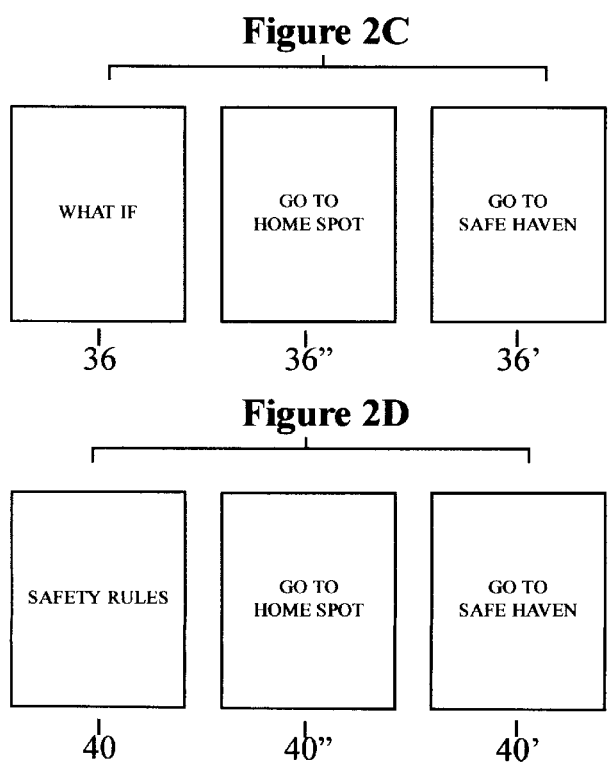
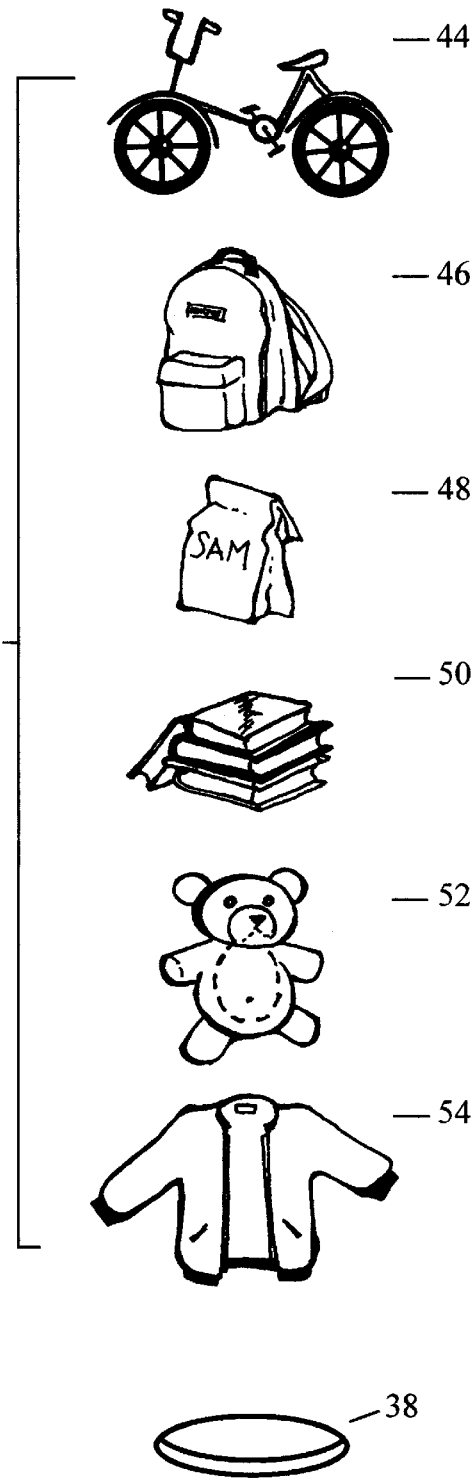
Figure 2E
Figure 2F

EDUCATIONAL BOARD GAME

FIELD OF THE INVENTION

This invention is directed to board games, and in particular to an educational board game that teaches children how to remain safe in potentially-dangerous situations.

BACKGROUND OF THE INVENTION

Child safety is an important issue for many parents. Keeping children safe when adult supervision is not possible, or appropriate, can be especially troubling to parents. In today's society, children face any number of potentially-dangerous situations. Properly educating children can help them make prudent decisions independently, to navigate through such dangerous situations without unnecessary strife. Safety education can arm children with the knowledge required to help them make appropriate decisions.

Although safety education is designed to help children make safety-minded decisions, if approached in a careless or threatening manner, safety education may arguably do more harm than good. For example, simply alerting children to dangerous scenarios, without providing possible solutions, may cause children to feel powerless or to worry excessively about such situations.

Discussing dangerous situations can be frightening for many children. Therefore, care must be taken to ensure that safety education is conducted in a manner that empowers children by providing information needed to handle various situations. Safety education should not merely make children afraid.

Thus, what is needed is a teaching device for raising a child's awareness of potentially dangerous situations. Such a device is preferably in a game format that allows parents and children to interact in a friendly manner, while allowing children to feel proud of the safety knowledge they have mastered. The game should create safety-related discussions between parents and children, providing an alternative to traditional lectures. The game should also teach children about dangers in a non-threatening setting, through the use of hypothetical situations. The game should teach players safety information efficiently, with players learning from answers provided by other players. The game should also be customizable to provide additional scenarios and questions, thereby reflecting various settings, addressing additional issues that may develop over time, and allowing discussion of new information as basic information is mastered.

SUMMARY OF THE INVENTION present invention is an educational board game useful for teaching children how to stay safe. Broadly, the game includes a game board and a set of player position markers to be selectively placed on a play path on the game board. Movement around the board is directed by included dice, and players take turns moving among the various spaces that make up the play path. The spaces on the play path are divided into several categories, including "home" locations, "street crossing" locations, "what if" locations, "safety rules" locations, and "safe haven" locations. Landing on each type of location produces distinct results.

The game helps children recognize and deal with potential dangers that may be encountered outside of one's home. As players move their position markers along the play path, their knowledge of safe behaviors for potentially-dangerous situations is tested. For example, when a player lands on a "what if" play space, the player draws a card from a corresponding deck of "what if" cards. These cards each present a hypothetical situation in which the player might find himself. The player is required to explain how he would behave in the situation presented. A reward is given if the player provides an acceptable response.

Players may also land on "safety rules" board spaces. These spaces have an associated deck of "safety rules" cards, with each card asking a question related to a specific rule of safety. Players are rewarded for providing correct answers to the questions found on "safety rules" cards.

The game also addresses the concept of finding an appropriate place to go when faced with danger. Players are rewarded for landing on any of the "safe haven" board spaces. Each "safe haven" space is decorated to represent an actual location in which a child may actually find refuge in real life.

The present invention also explores street crossing safety rules. When a player lands on a "street crossing" board space, the player is asked to recite one of an accepted group of rules that should be followed when crossing a street. Players are rewarded for correctly reciting one of the accepted rules.

Player rewards take the form of tokens that are saved for later trading, in groups of four, for collectible items needed to win the game. After a player has traded tokens for each of the needed collectible items, the player may win the game by returning to the "home" space that corresponds to the color of his player location marker.

Thus, it is an objective of the instant invention to provide an educational board game that teaches children how to remain safe through the use of hypothetical situations, allowing children to learn about dangers in a non-threatening setting.

A further objective of the instant invention is to provide an educational board game that teaches children by prompting safety-related discussions between parents and children, thereby providing an alternative to traditional lectures.

Another objective of the instant invention is to provide an educational board game that teaches children how to remain safe by allowing parents and children to interact in a friendly manner, while allowing children to feel proud of the safety knowledge they have mastered.

Still an additional objective of the instant invention is to provide an educational board game that teaches children how to remain safe by providing a customizable set of scenarios and questions to reflect various settings, addressing additional issues that may develop over time, and allowing discussion of new information as basic information is mastered.

Yet a further objective of the instant invention is to provide an educational board game that teaches children how to remain safe by allowing players to absorb safety information efficiently, with players learning from the answers provided by other players.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWING

FIG. 2A is a pictorial view of a single die used in the educational game of the present invention;

FIG. 2B is a pictorial view of a position marker of the educational game of the present invention;

FIG. 2C is a pictorial view of "what if" cards of the educational game of the present invention;

FIG. 2D is a pictorial view of "safety rules" cards of the present invention;

FIG. 2E is a pictorial view of a set of collectible pieces of the present invention;

FIG. 2F is a pictorial view of a token of the educational game of the present invention.

DETAILED DESCRIPTION OF THE PREFERRED EMBODIMENT

Figure 1:
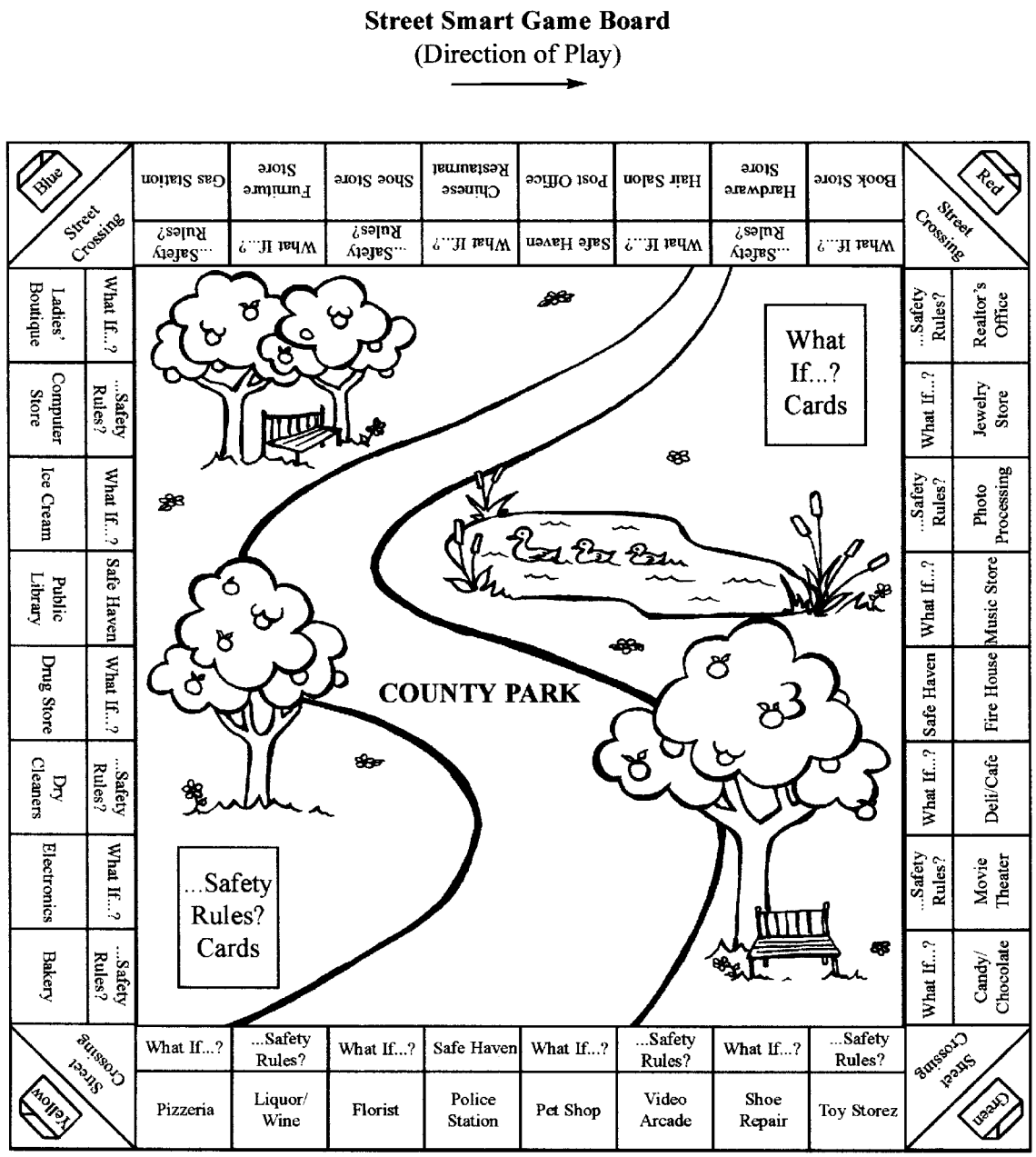
FIG. 1 is a top view of the game board of the educational game of the present invention.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now with reference to FIG. 1, the educational board game 10 of the present invention is shown. By way of overview, the game 10 includes a game board 12 having a play path 14 that borders a central region 16. The play path 14 is divided into predefined play locations or spaces 18, with each play location being sized to accept player position markers 20 included with the game 10. Movement of the markers 20 along the play path 14 is governed by rolling an included pair of dice 22.

As seen in FIG. 1, the game board 12 is essentially square, and the play path 14 defines the perimeter of the game board. The play path 14 is divided into a contiguous series of play locations 18. There are five categories of play locations: "home" locations 24, "street crossing" locations 26, "what if" locations 28, "safety rules" locations 30, and "safe haven" locations 32. Each of the four corners 34 of the board 12 contains a "home" location 24 and a "street crossing" location 26. The balance of the play locations 18 are either a "what if" location 28, a "safety rules" location 30, or a "safe haven" location 32.

Each "home" board space 24 includes indicia that matches indicia on the player position markers 20. In this manner, each of the "home" board spaces 24 is associated with one player position marker 20. In a preferred embodiment, four colors are used as the indicia: yellow, blue, green, and red.

Play begins with the position markers 20 being placed on their corresponding "home" spaces 24. As game play progresses, the players take turns rolling a pair of dice 22 and moving their chosen position marker 20 clockwise along the play path 14 in accordance with the result of the dice roll.

Turns are taken following the ascending age order of the players. Although dice 22 are used in a preferred embodiment, any desired random number generating device, including a spinner or a computer, may also be used.

If a player lands on a "what if" space 28, the player is required to draw a "what if" card 36 from a deck of included "what if" cards. Each "what if" card 36 presents a situation in which the player might find himself and poses a question related to the situation. If the player provides an appropriate response, he is rewarded with two tokens 38, with the tokens being used to win the game 10, as described below.

Similarly, if a player lands on a "safety rules" space 30, the player is required to draw a "safety rules" card 40 from a deck of included "safety rules" cards. Each "safety rules" card 40 presents a question, the answer to which requires knowledge of safety-related rules. If the player provides an appropriate answer to the question posed by the card 40 drawn, he is rewarded with one token 38, with the token being used to win the game 10, as described below.

A player may also be directed to place his position marker 20 on a "safe haven" board space 32. This may occur during the normal course of play, as when the marker 20 is moved in response to rolled dice 22, or it may occur when a special "go to your safe haven" card 36, 40' is drawn from either the "what if" deck of cards 36 or the "safety rules" deck of cards 40. If a player lands on a "safe haven" board space 32 in response to the roll of the dice 22, that player receives one bonus token 38, to be used as described below. If a player is directed to travel to a "safe haven" board space 32 by drawing one of the "go to your safe haven" card 36',40', that player receives one bonus token 38, to be used as described below. A player may also land on a "safe haven" board space 32 by providing a correct response to a question; a player doing so will receive two bonus tokens 38.

The "safe haven" board spaces 32 are decorated to represent locations to which a player might actually travel, in real life, when faced with danger. Accordingly, these "safe haven" spaces 32 include indicia commonly associated with locations such as police stations, fire stations, post offices, and public libraries. Other locations may also be represented, as desired.

In a preferred embodiment, the play path 14 includes four such "safe haven" spaces 32, with each "safe haven" space corresponding to one of the included player position markers 20. However, more, or fewer, "safe haven" spaces 32 may be included to change the nature of the play path 14.

During normal course of play, when a player lands on one the board corners 34, his position marker 20 is placed in the "street crossing" space 26, not the "home" space 24. A player occupies a home space 24 when directed to do so by one of the cards 36,40, or in response to a question. When a player lands on a "street crossing" space 26, the player is required to recite one rule from a predetermined set of rules which players are to follow when actually crossing a street, in real life. If the player correctly recites one of the accepted rules, he is rewarded with one token 38, with the token being used to win the game 10, as described below.

As the game 10 progresses, players earn the above-described tokens 38 and exchange them, in groups of four, for any of six different collectable pieces 42. The collectable pieces 42 are miniature versions of items often possessed by children, in real life: a bicycle 44, a book bag 46, a lunch bag 48, a bundle of books 50, a toy 52, and a jacket 54. Other items may be chosen as collectable pieces 42, if desired.

Once a player has gathered an entire set of the six different collectable pieces 42, that player may win the game 10 by returning to the corresponding "home" board space 24. Players may return to the appropriate "home" space 24 in two ways. After gathering all six collectible pieces 42, the player may, during the course of normal play, simply move his position marker 20 around the play path 14 until his position marker 20 lands on, or travels past, his "home" space 24. The player may alternatively use one of the special "return home" cards 36",40" found in the "what if" and "safety rules" card decks 36,40.

Figure 3:
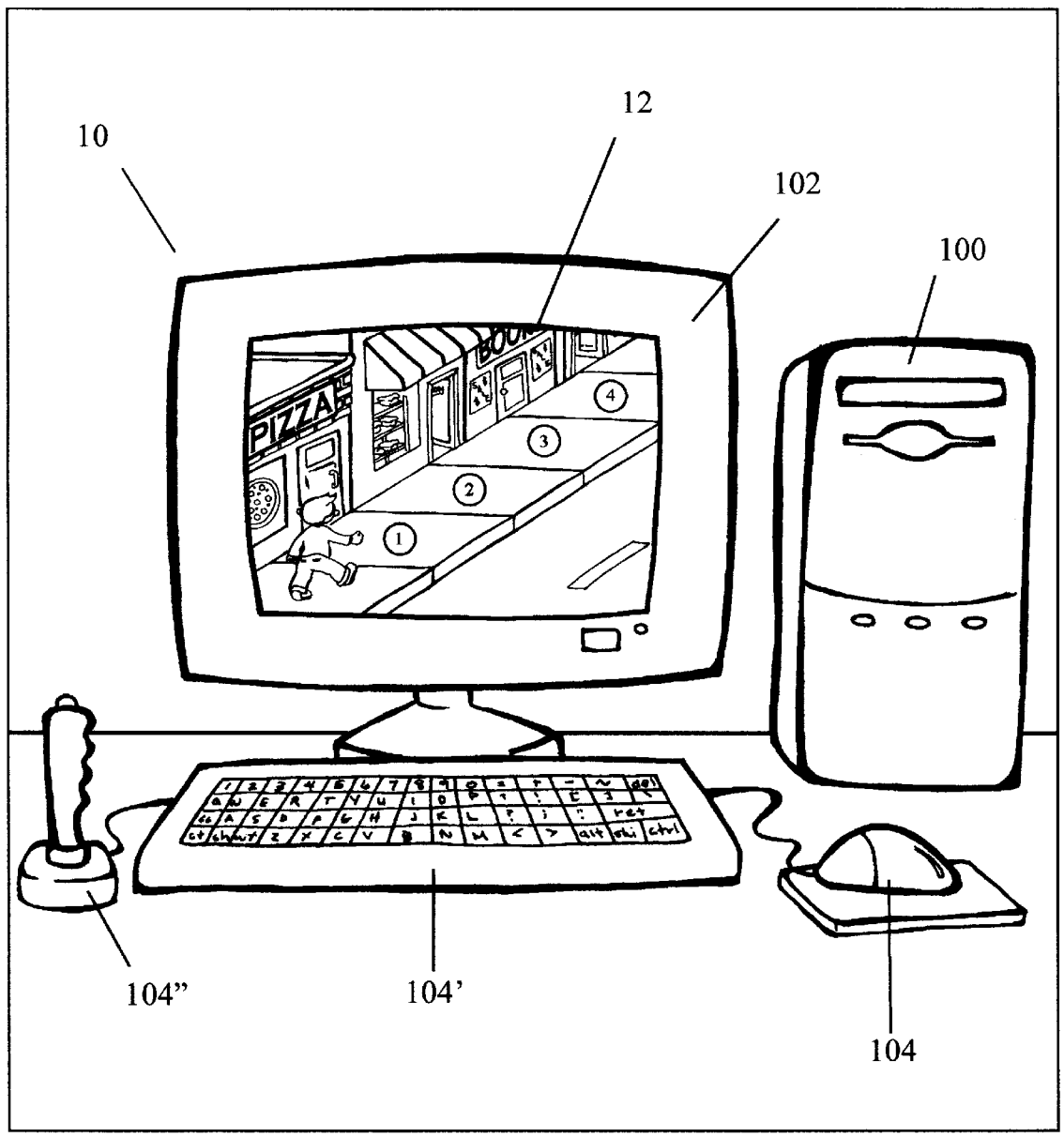
FIG. 3 shows the educational game of the present invention being played on a computer.
Figure 5A:
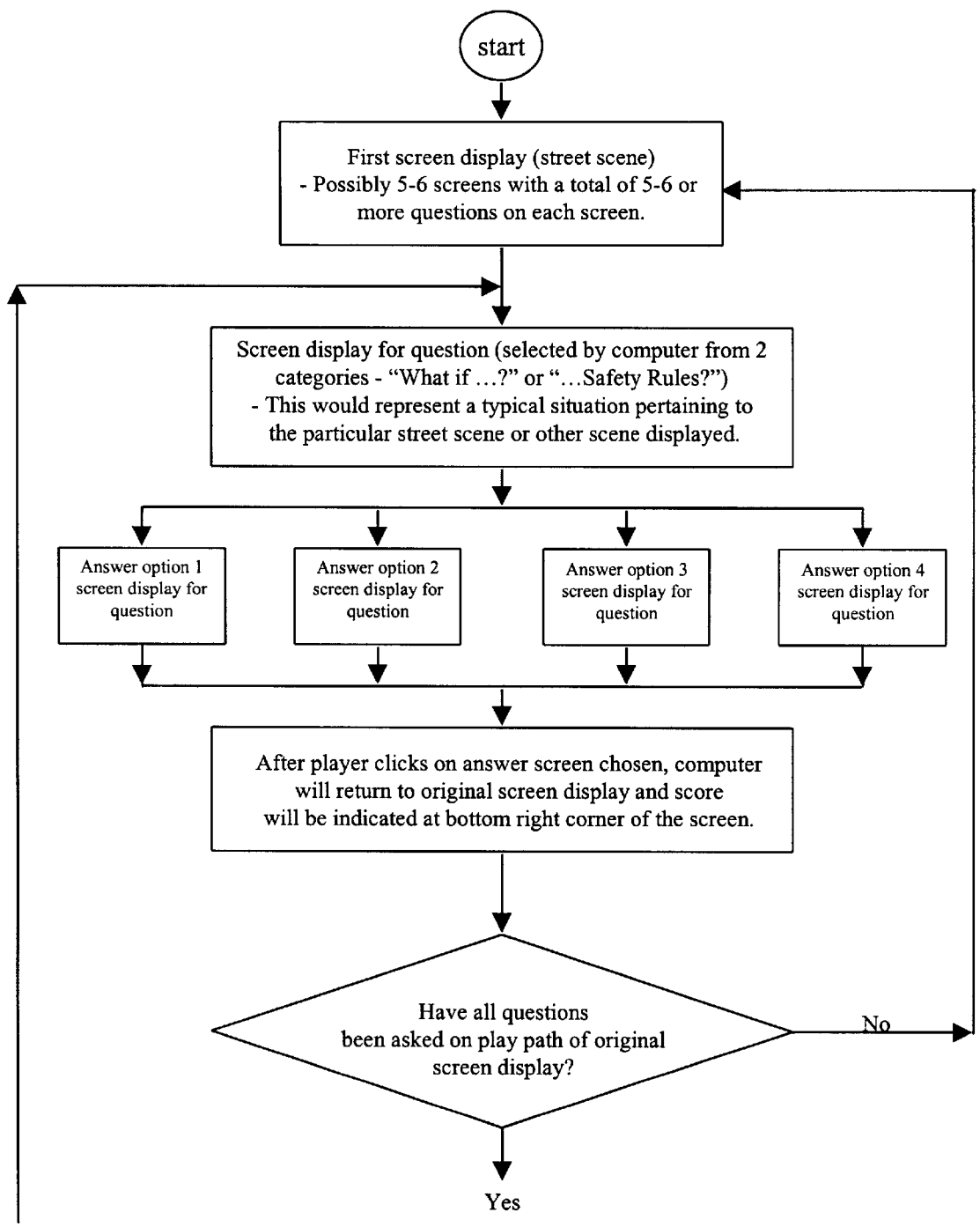
FIG. 5A shows a schematic representation of the first half of program flow followed as the game is played on a computer.
Figure 5B:
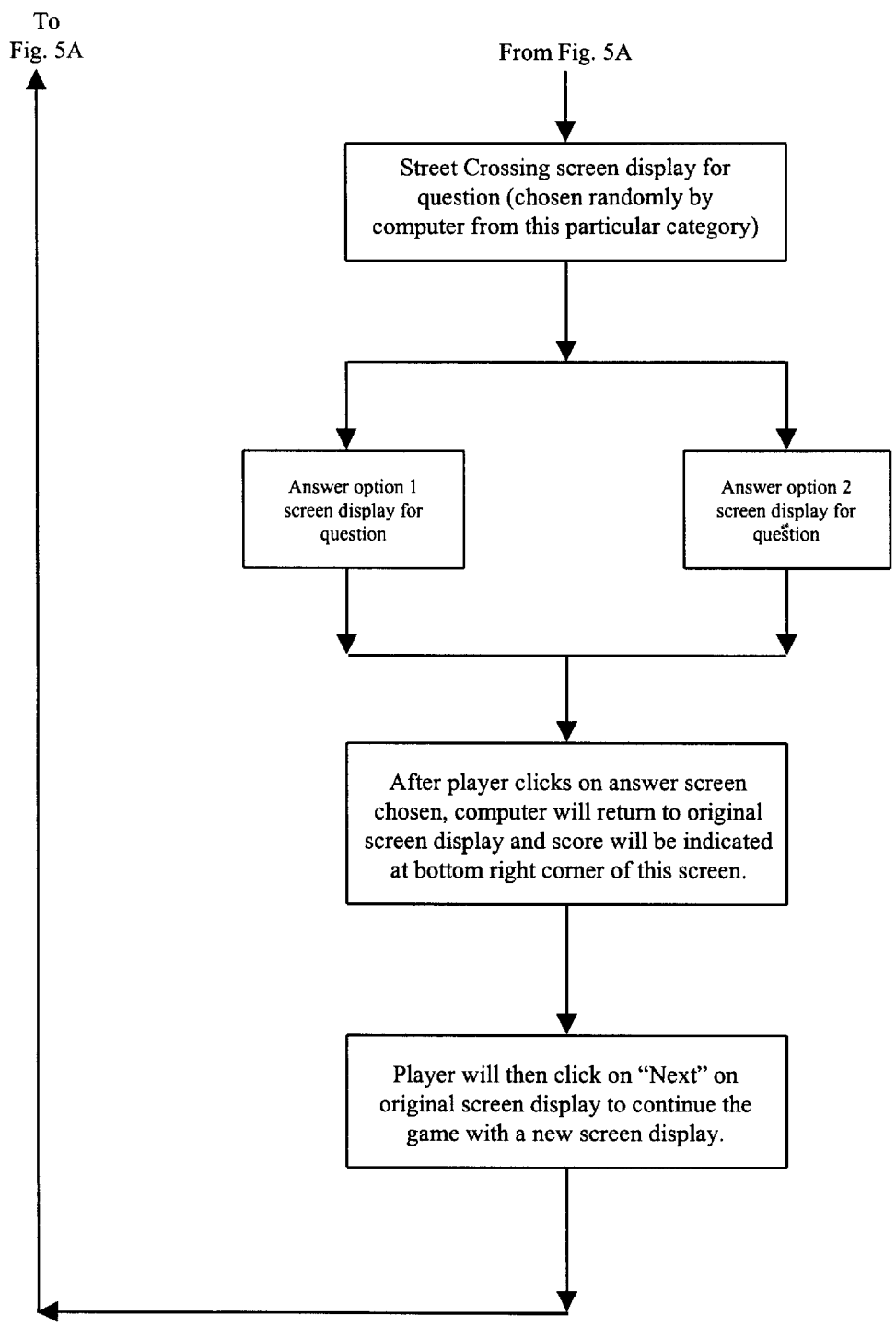
FIG. 5B shows a schematic representation of the first half of program flow followed as the game is played on a computer.

As shown in FIG. 3, in an alternate embodiment, the game 10' may be played on a computer 100. In such an embodiment, the board 12' may be represented on a computer monitor 102. The computer 100 includes an input device 104, so that players may interact with the computer. Although the preferred input device 104 is a mouse, other devices including, but not limited to, a keyboard 104' or a joystick 104, may also be used, as desired. In the computerized embodiment 10', dice 22 may be replaced by a random number generating routine executed by the computer 100. The goals of the alternate embodiment of the game 10' are substantially the same as in the primary embodiment of the game 10. The computer 100 would follow the flow path depicted in FIGS. 5A and 5B.

In the primary computerized embodiment 10', the game is played by one player at a time after initial instructions or directions are given from a parent or adult friend. The player can then play by him or herself. At the beginning of this interactive game, the player will log on with name, age, and the type of neighborhood he/she lives in (e.g. suburban, city, country, etc.). The questions could also be tailored according to the age of the player and the type of neighborhood.

Figure 4:
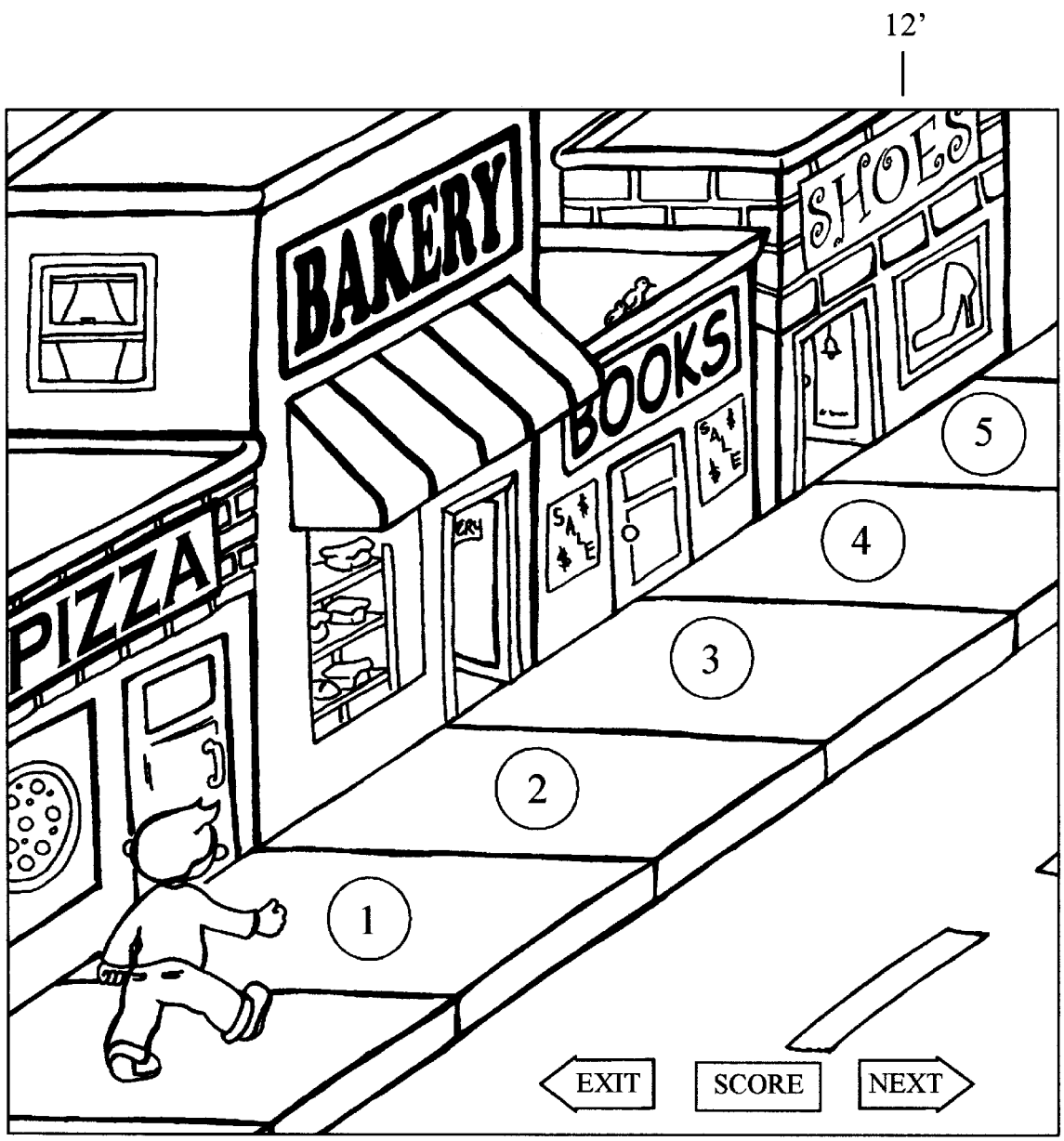
FIG. 4 shows a close-up view of the computer screen shown in FIG. 3.

As seen in FIG. 4, the screen will initially display a street scene with the player at one corner of the screen. A play path, resembling a sidewalk, runs across the center of the screen, with shops on either side of the path. On this path, there would be five circles with numbers on each, designated as 1–5. The player will have to click on the circle with number 1 to start the game. The player on the screen would start walking along this path and each time a number is clicked, a certain screen display will be triggered that represents a potentially dangerous situation the player could face while alone on the street. Alternatively, the particular environment could also indicated by the original screen display. The types of screen displays could also represent different environments in which the player could find him or herself, such as a playground, a school, a mall, a zoo, or an amusement park, etc.

The computer would then ask the player a question that corresponds to the situation represented by the screen display. This question would be taken from one of the two categories, "What if . . . ?" or " . . . Safety rules?", selected randomly by the computer. The answer for each of these questions would be in the form of multiple choice, with four choices for each question, designated as A–D. With each choice, the screen would display a scenario that corresponds to the answer. All four choices would be displayed on one screen, not shown, that is divided into four quadrants. After hearing all possible choices and seeing the displays, the player would choose one of the answers. If correct, one or two point(s) will be given to the player. This could be displayed at the bottom right corner of the screen, so the player can keep a tab of his/her score at all times during play.

When a correct response is given, an applause or some form of praise would be given to encourage the player. If an incorrect response is given, the computer would then give a more suitable response, so the player would learn from information given.

After giving a response to the question, the player may move onto the next circle on the play path. The screen will display the original street scene (or other environment), with the score displayed at the bottom right corner of the screen. Once the player completes all questions displayed on the first screen, a street crossing question would be prompted. The player would then choose one of the accepted rules for crossing street (perhaps only two choices would be given here). After a correct response, the player then moves onto the next screen by clicking "Next" at the bottom right corner of the screen that represents a move forward. Then, a different screen will be displayed with similar setup and numbered circles. The player will proceed as with the first screen until all questions on the five or six screens have been answered. The final score of the player would be displayed to indicate the end of the game.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. An educational board game comprising:
   a plurality of player position markers adapted to be selectively placed upon a play path, each of said position markers corresponding to a player of said game;
   a plurality of tokens;
   a game board having said play path disposed thereupon, said play path being divided into a plurality of predetermined play locations, each of said play locations being sized to accept at least one of said position markers, said play locations being subdivided into a plurality of categories,
   a first of said categories being "home spot" play locations, each of said "home spot" play locations corresponding to one of said position markers;
   a second of said categories being "street crossing" play locations, said "street crossing" play locations requiring a player to recite one rule from of a set of accepted rules for safely crossing a street corner upon placing said position marker corresponding to said player thereupon, said player receiving at least one of said tokens upon reciting said one rule of said set of rules;
   a third of said categories being "what if" play locations, said third category having a first deck of cards associated therewith, one of said cards being drawn by one of said players when said player places his position marker upon one of said "what if" locations each of said first deck of cards requiring a response from a player who draws said first card, said required response testing knowledge of behavior appropriate for a set of potentially-dangerous scenarios, said player receiving at least one of said tokens upon providing said required response;
   a fourth of said categories being "safety rules" play locations, one of said first deck of cards being drawn by one of said players when said player places his position marker upon one of said "safety rules" play locations, said fourth category having a second deck of cards associated therewith, each of said second deck of cards requiring a response from a player who draws said second card, said response testing knowledge of a set of safety rules, said player receiving at least one of said tokens upon providing said required response;

a fifth of said categories being "safe haven" play locations, said "safe haven" play locations requiring that a player placing his position marker thereupon receive at least one of said tokens;

a plurality of collectible pieces divided into a plurality of categories, with possession of one collectible piece from each category being required to win said game, said collectable pieces obtainable by said players through trading a plurality of said tokens therefor;

a random number generator for regulating motion of said player position markers along said play path.

2. The educational board game of claim 1, wherein one of said players wins said game when said player places his position marker on said corresponding "home spot" play location when said player has at least one collectible piece from each of said collectible piece categories.

3. The educational board game of claim 2, wherein said first deck of cards includes a "go to home spot" card, the drawing of which allows the player who has drawn said card to selectively place said position marker that corresponds to said player upon said "home spot" play location that corresponds to said position marker.

4. The educational board game of claim 2, wherein said first deck of cards includes a "go to safe haven" card, the drawing of which directs the player who has drawn said card to place said marker that corresponds to said player upon one of said "safe haven" play locations, said player thereby receiving a plurality of said tokens.

5. The educational board game of claim 1, wherein:

said plurality of position markers, said plurality of tokens, said game board, said first deck of cards, said second deck of cards, and said collectible pieces are represented by computerized images displayed on a display device operatively attached to a computer, said computer being guided by a set of instructions; and said random number generator is a routine selectively performed by said computer.

* * * * *